No. 754,069. Patented March 8, 1904.

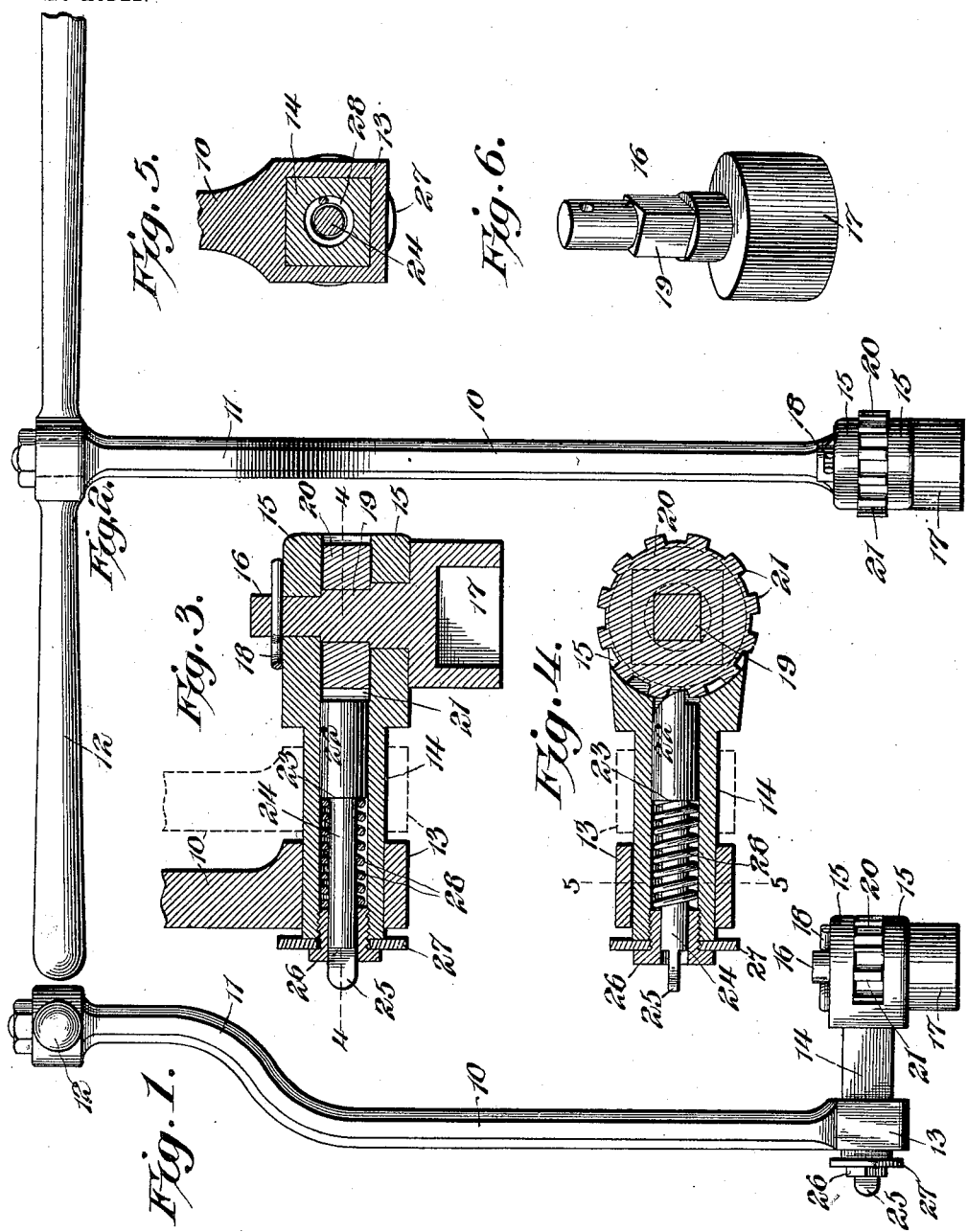

UNITED STATES PATENT OFFICE.

WILLIAM R. JOHNSON, OF FREEPORT, ILLINOIS.

WRENCH.

SPECIFICATION forming part of Letters Patent No. 754,069, dated March 8, 1904.

Application filed March 19, 1903. Serial No. 148,546. (No model.)

*To all whom it may concern:*

Be it known that I, WILLIAM R. JOHNSON, a citizen of the United States, residing at Freeport, in the county of Stephenson and State of Illinois, have invented a new and useful Wrench, of which the following is a specification.

This invention relates more particularly to that class of wrenches employed in operating the nuts that secure the teeth of thresher-cylinders and the like. Some of these nuts are located in places that are extremely difficult of access, and wrenches of various configurations have been devised for the purpose of actuating the same. While these wrenches may generally be applied to the nuts, it very often happens, because of interfering radial arms or surrounding bands of the cylinder, that the wrench cannot be moved after application.

It is one of the objects of this invention to provide a connection between the nut-engaging head and the handle that will permit their free relative movements, and thus said handle may be moved without prohibitive interference on the part of the elements above mentioned.

A further object is to provide a structure in which the parts are extremely simple, can be readily assembled or disassociated, and are reversible to permit the operation of the instrument under different conditions.

The preferred embodiment of the invention is illustrated in the accompanying drawings, wherein—

Figure 1 is a side elevation of the wrench. Fig. 2 is a front elevation of the same. Fig. 3 is a vertical sectional view taken longitudinally of the stem, head, and stock, with part of the latter broken away. Fig. 4 is a horizontal sectional view taken on the line 4 4 of Fig. 3. Fig. 5 is a transverse sectional view through the lower portion of the stock, taken on the line 5 5 of Fig. 4; and Fig. 6 is a detail perspective view of the wrench head and shank.

Similar reference-numerals indicate corresponding parts in all the figures of the drawings.

In the embodiment illustrated a stock 10 is employed, having an offset portion 11 located contiguous to one end, which end is provided with a suitable handle 12. The other end of the stock is enlarged and provided with a transversely-disposed angular socket 13, in which is fitted a transversely-disposed angular stem 14, said stem being thus held against rotation and being freely slidable through the socket. One end of the stem is provided with spaced longitudinal projecting ears 15, through which is passed a shank 16, that consequently extends across the spaces between the ears. A suitable wrench-head 17 is arranged upon one end of the shank, while the other end projects beyond the adjacent ear in order to receive a holding-key in the form of a spring-cotter 18. The portion 19 of the shank 16 between the ears is angular, and a ratchet-wheel 20, fitted between the ears, is provided with an angular opening, through which said portion 19 passes. This wheel 20 has a peripheral series of teeth 21, engaged by the inner end of a dog 22, located longitudinally within the stem 14, which is made hollow for this purpose. The dog 22 is provided with a shoulder 23 and a shank 24, that extends through the stem 14 and projects beyond the rear end thereof, forming a handle-piece 25. A plug-nut 26, threaded into the rear end of the stem, constitutes the holding means for a stop-washer 27, that limits the movement of the stem in one direction by engaging the stock 10. Said plug-nut also constitutes one bearing for a coiled spring 28, surrounding the shank 24 and bearing at its front end against the shoulder 23 of the dog, thus urging said dog into engagement with the ratchet-wheel.

In using this device the head is first applied to the nut, after which the handle or stock may be oscillated, thereby rotating said head. If there should be an obstruction, which under normal conditions would prevent the movement of the stock by sliding said stock longitudinally upon the stem, the obstruction can be readily cleared sufficiently to permit a slight oscillatory movement to the stock. If it is desired to reverse the head, it is only necessary to remove the stem from its socket and replace it in any different angular relation desired. To reverse the movement of the head, it is only necessary to turn the dog through a one-half revolution.

It will be apparent from the drawings that the different parts can be easily manufactured at small cost and readily assembled or disassociated. Simplicity is therefore one of the features of the invention, as is also the freely-slidable or relative movement of the stock and the nut-engaging head.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a wrench, the combination with a stock having a transverse angular socket, of an angular stem slidably fitted and freely movable in the socket, said stem being held against rotation in the socket throughout its entire sliding movement, a stop carried by the stem and engaging the stock for limiting the extreme movement of said stem in the socket, and a head revolubly mounted on one end of the stem.

2. In a wrench, the combination with a stock having a transverse angular socket, of a stem slidably fitted in the socket, a head revolubly mounted on the stem, a dog carried by the stem and coacting with the head, and a stop-washer detachably fitted upon the end of the stem to limit the movement of the latter in the socket.

3. In a wrench, the combination with a stock having a transverse socket, of a hollow stem slidably fitted in the socket, a head revolubly mounted on the stem, a dog located in the stem and coacting with the head, a stop-washer arranged upon one end of the stem, and a plug threaded into the stem and bearing against the washer to hold the same in place.

4. In a wrench, the combination with a stock having a socket, of a hollow stem slidable in the socket, a revoluble head mounted on the stem on one side of the stock, and a dog slidably mounted in the hollow stem and coacting with the head, said dog having an exposed actuating end projecting from the stem on the side of the stock opposite the head.

5. In a wrench, the combination with a stock having a transverse socket, of a transversely-disposed hollow stem slidably fitted in the socket of the stock, a head revolubly mounted on one end of the stem and having ratchet-teeth, a shouldered dog slidably and revolubly fitted in the stem, one end of the dog engaging the teeth, the other end projecting from the opposite end of the stem, a screw-plug threaded into the stem and surrounding the dog, and a coiled spring interposed between the plug and the shoulder of the dog.

6. In a wrench, the combination with a stock having a transversely-disposed socket, of a hollow stem slidably fitted in the socket and provided at one end with spaced ears, a head having a shank journaled in the ears, a ratchet-wheel fitted upon the shank and located between the ears, and a slidable spring-pressed dog located within the stem and coacting with the ratchet-wheel.

In testimony that I claim the foregoing as my own I have hereto affixed my signature in the presence of two witnesses.

WM. R. JOHNSON.

Witnesses:
JOHN H. SIGGERS,
FLORENCE E. WALTER.